Patented Nov. 30, 1948

2,455,042

UNITED STATES PATENT OFFICE 2,455,042

PROCESS OF PLASTICIZING POLYVINYL CHLORIDE COMPOSITIONS

Leslie Budworth Morgan, Baguley, and Paul Russell, Austin Atkinson Gibson, Robert Arbuthnott Kinnear, and Reginald Grime Heyes, Welwyn Garden City, England, assignors to Imperial Chemical Industries Limited, a corporation of Great Britain No Drawing. Application May 16, 1946, Serial No. 670,310. In Great Britain March 28, 1945

11 Claims. (Cl. 260—34.2)

This invention relates to improved vinyl chloride polymer compositions.

In British patent specification No. 500,298 a process is claimed for the gelatinisation of polyvinyl compounds which consists in uniformly distributing them in a finely powdered condition, while avoiding pressure and/or heating, in a practically non-volatile plasticising agent in which they are scarcely soluble to insoluble at room temperature, and then gelatinising the dispersion obtained by heating without the application of pressure to temperatures at which complete gelatinisation occurs.

It has been found that the said dispersions frequently can only be stored for a relatively short time at room temperature without becoming too stiff to be workable and consequently must be used within a few days after their preparation. The dispersions based on polyvinyl chloride and in which the plasticising agent is dibutyl phthalate are particularly unstable.

It is an object of the present invention to prepare dispersions of vinyl chloride polymers in a practically non-volatile plasticising agent which have a long storage life. Other objects will appear hereinafter.

According to the present invention these objects are accomplished by heating a powdered vinyl chloride polymer, as hereinafter defined, which is substantially free from volatile constituents, at elevated temperatures for a time sufficient to cause at least a partial softening of the polymer, but insufficient to cause appreciable decomposition, reducing the product to a finely powdered condition, if not already in that state, and thereafter uniformly distributing it at a temperature less than 60° C. in a practically non-volatile plasticising agent in which it is from scarcely soluble to insoluble at ordinary temperatures.

According to the set of preferred conditions our process comprises heating a powdered material, consisting of or containing a vinyl chloride polymer, said material being free from volatile constituents and being in the form of a contiguous mass, at a temperature T° C., where T° C. lies within the range 75° C.–150° C., for a length of time greater than $t$ minutes where $$t = 10^{\left(\frac{3890}{T+273.1} - 9.14\right)}$$

but for less time than that required to produce decomposition of the vinyl chloride polymer at the temperature T° C., and thereafter reducing the product to a finely divided powder, if not already in that state, and uniformly distributing it at a temperature less than 60° C. in a practically non-volatile plasticising agent in which it is from scarcely soluble to insoluble at room temperature.

By the expression "powdered material in the form of a contiguous mass" as used throughout the specification and appended claims we mean a powdered material existing in a physical state in which the powder is not dispersed in another medium. Thus a powder falling through air, as in a spray drying apparatus, is not included within the ambit of this definition, although a powder maintained in motion by, for example, scraper blades, is included within its scope.

The preferred heat-treatment described above may be carried out, for example, by heating in ovens on trays or on belt-conveyers.

According to another set of preferred conditions, the process of our invention comprises heating a material, comprising a vinyl chloride polymer dispersed in a volatile liquid, in a spray drying apparatus until said polymer is free from volatile constituents and thereafter continuing the heating of said polymer in said spray-drying apparatus until at least partial softening of the polymer takes place, the outlet temperature of said spray-drying apparatus being between 85° and 110° C. A product which is particularly amenable to fine grinding and for use in the production of dispersions which are stable at room temperature for a number of years are obtained when the outlet temperature of the spray-drying apparatus lies between 90° C. and 95° C.

The term "volatile liquid" is used herein with reference to any liquid having a boiling point less than 200° C. at atmospheric pressure.

By the term "vinyl chloride polymers" as used throughout this specification and the appended claims we mean high molecular weight polymers produced by the polymerisation of vinyl chloride alone, referred to hereinafter as "polyvinyl chloride," interpolymers produced by polymerising vinyl chloride with other polymerisable compounds and heteropolymers produced by polymerising vinyl chloride in admixture with compounds which, although incapable of polymerisation when alone, are capable of polymerisation in admixture with vinyl chloride. The invention, however, is limited to such polymer, copolymer and interpolymer in which the polyvinyl chloride is present in amount not less than 95% of the total weight thereof.

The term "high molecular weight polymers" is used with reference to these polymers which have a viscosity index ($k$ value) of more than 40. For "k value" see Cellulose Chemie, 1932, pages 58 and 71.

Polyvinyl chloride is the preferred material for use in the present invention.

Vinyl chloride polymers can be prepared for use in the present invention by any method known to the art, for example, by bulk, granular, or emulsion polymerisation. Preferably the polyvinyl chloride is produced by emulsion polymerisation, and the product dried in a spray drying apparatus. Thereafter the product is given the heat-treatment according to the invention, by continued treatment preferably in the spray drier or in an apparatus in which the product is employed in the form of a contiguous mass.

The heat-treated polymer may be reduced to a fine powder by any known method of grinding, for example, in a ball, colloid or roller mill. The polymer may be given most or all of this grinding treatment prior to the heat treatment of the present invention; it is, however, frequently necessary for it to receive a further grinding after the heat treatment in order to produce a finely divided powder suitable for admixture with plasticiser in accordance with the present invention.

As stated hereinbefore, the process of our invention comprises the step of heating a powdered vinyl chloride polymer, substantially free from volatile constituents, at elevated temperature. Normally a powder which is finely divided is found to yield a final product having the most satisfactory properties. The particle size of the powder is not critical although powders having a surface area of at least 1500 sq. cms. per gram are preferred.

The particle size of the heat-treated polymer which is admixed with plasticiser has been found to have a somewhat greater influence on the storage life of the resulting composition than has the particle size of the polymer subjected to heat-treatment and although, again, the particle size has not been found to be critical in obtaining compositions of longer storage life than those customarily produced by methods according to the teachings of the prior art, it is preferred that the polymer powder admixed with plasticiser has a surface area of at least 7,000 sq. cm. per gram.

We find that, in order to prepare smooth dispersions in which the two phases have little tendency to separate, the particles of heat-treated polymer should be slightly swollen by the plasticiser phase. Furthermore, with an increase in the extent of the heat-treatment of this invention, there is a decrease in the rate of swelling of the polymer by the plasticiser at room temperature and, in consequence, when the polymer employed is one which has been given a considerable heat treatment, we prefer that the dispersion produced therefrom be heated at 40–50° C. for a short time before use, preferably immediately following their preparation.

Preferred plasticisers for use in the present invention have a vapour pressure not greater than $1.3 \times 10^{-5}$ mm. at 20° C. It is also preferred that the vinyl chloride polymer should not have a solubility in the plasticiser selected greater than 5% at 20° C., based on the weight of the plasticiser.

Suitable plasticising agents which may be used according to the present invention include dibutyl phthalate, tricresyl phosphate and dihexyl phthalate.

Ancillary ingredients which include stabilisers, such as lead silicate, dyes and pigments may also be added to the dispersions or to the vinyl chloride polymer employed for their preparation.

Our invention is illustrated but in no way limited by the following examples.

*Example I*

300 gms. of emulsion polymerised polyvinyl chloride as sold under the description "Corvic" (registered trade-mark) 675/1 was spread out in a drying tray measuring 40 cms. × 15 cms. and preheated to 90° C, the depth of polymer in the tray being about 1 cm. (bulk density of polymer 0.5 gms./cc.).

The tray was heated in an oven at 90° C. for 43 minutes, the polymer thereafter being cooled, removed from the tray and ground in an end runner mill until it had a surface area of 8,300 sq. cms./grams. Substituting in the formula $$t = 10^{\left(\frac{3890}{T+273.1} - 9.14\right)}$$

it is noted that the minimum time of treatment at 90° C. is 40 minutes.

50 gms. of the product was stirred with 50 gms. of tricresyl phosphate together with 2 gms. lead carbonate at 50° C. for 3 hours. The resulting paste had a viscosity of 150 poises at 25° C. The paste was stored for 12 months and showed no signs of deterioration.

When heated at 150° C for 15 minutes it gelled to give a product which was tough, rubbery, and highly resistant to chemical attack. When gelled against the interior surface of a metal pipe the product was found to be well suited for the conveyance of corrosive liquids, e. g. dilute mineral acids.

*Example II*

This example illustrated the use of a polyvinyl chloride latex in the production of a plasticiser/polymer paste using a conventional spray-drying apparatus.

The spray-drying apparatus employed consisted essentially of a drying chamber in the shape of a cylinder surmounting an inverted cone, an inlet port for the polymer latex leading to a rotary atmoser and an inlet grid for preheated air at the head of the cylinder, means for collecting the heat treated polymer and an outlet tube for the moisture laden air near the foot of the cone.

Dry air (relative humidity 1%) was preheated to 203° C. and forced into the drying chamber by a blower at a volume rate of 6500 cu. ft./min. at 15° C. Latex containing 30% of polyvinyl chloride, as used in the manufacture of "Corvic" (registered trade-mark) 675/1, was fed onto the atomising disc at such a rate that the temperature of the moisture laden air at the outlet was 91° C.

Under these conditions the primary particles produced by the evaporation of water from the latex globules underwent a substantial degree of sintering, thereby indicating that in the course of the treatment partial softening of the polymer has taken place. 50% of the polyvinyl chloride was recovered from the spray drier. The air from the outlet of the drier was passed through a cyclone separator from which a further 30% of polymer was obtained. A further 15% of polymer was separated from the air by stocking filters. The polymer obtained was admixed with plasticiser as described and Example I and a similar product obtained.

We claim:

1. The process of producing improved polyvinyl chloride compositions which comprises heating a powdered vinyl chloride polymer in which the vinyl chloride content is at least 95% and which is substantially free of volatile constituents, at a temperature between 75° C. and 150° C. until the polymer partially softens, and thereafter uniformly distributing the polymer at a temperature below 60° C. in a substantially non-volatile plasticising agent in which it is substantially insoluble at room temperature.

2. The process of claim 1 in which the polymer is in the form of a contiguous mass and is heated for a number of minutes greater than $$10^{\left(\frac{3890}{T+273.1}-9.14\right)}$$

where "T" is the temperature in degrees.

3. The process of claim 1 in which the polymer is heated upon trays in an oven.

4. The process of claim 1 in which the polymer is dispersed in a volatile liquid and sprayed counter-current to a hot current of gas until the polymer is free of volatile liquid and thereafter continuing the heating of the said polymer in the same manner at a temperature of between 85° C. and 110° C.

5. The process of claim 1 in which the polymer before mixing with the plasticizer has a surface area of at least 1500 square centimeters per gram.

6. The process of claim 1 in which the polymer before mixing with the plasticiser has a surface area of at least 7,000 square centimeters per gram.

7. The process of claim 1 in which the mixture of polymer and plasticiser is heated between 40° C. and 50° C.

8. The process of claim 1 in which the plasticiser has a vapor pressure not greater than $1.3 \times 10^{-5}$ mm. at 20° C.

9. The process of claim 1 in which the solubility of the polymer in the plasticiser is less than 5% at 20° C. based on the weight of the plasticiser.

10. The process of claim 1 in which the plasticiser is dibutyl phthalate.

11. The process of claim 1 in which the vinyl chloride polymer is a homopolymer.

LESLIE BUDWORTH MORGAN.
    PAUL RUSSELL.
    AUSTIN ATKINSON GIBSON.
    ROBERT ARBUTHNOTT KINNEAR.
    REGINALD GRIME HEYES.

REFERENCES CITED

The following references are of record in the file of this patent:

FOREIGN PATENTS

| Number | Country | Date |
|---|---|---|
| 500,298 | Great Britain | Feb. 7, 1939 |